June 28, 1927.

E. W. BEASLEY 1,634,010

COTTON CHOPPER AND WEEDER

Filed Dec. 3, 1926    2 Sheets-Sheet 1

Inventor
Edwin W. Beasley,

By Clarence A. O'Brien
Attorney

June 28, 1927.

E. W. BEASLEY 1,634,010

COTTON CHOPPER AND WEEDER

Filed Dec. 3, 1926     2 Sheets-Sheet 2

Inventor
*Edwin W. Beasley,*

By *Clarence A. O'Brien*
Attorney

Patented June 28, 1927.

1,634,010

UNITED STATES PATENT OFFICE.

EDWIN WORTH BEASLEY, OF DURHAM, NORTH CAROLINA.

COTTON CHOPPER AND WEEDER.

Application filed December 3, 1926. Serial No. 152,422.

The present invention relates to an implement for chopping and weeding cotton, and has for its prime object to provide a machine of this nature which will enable one man with a single draft animal to accomplish the work of a relatively large number of laborers in a more efficient and expeditious manner.

Another very important object of the invention lies in the provision of a structure of this nature which may be controlled easily by the single operator so that any unevenness in the ground may be taken care of.

A still further very important object of the invention lies in the provision of a machine of this nature which is exceedingly simple in its construction, comparatively inexpensive to manufacture, strong and durable, thoroughly efficient and reliable in its operation, not likely to easily become out of order, compact and convenient, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1:
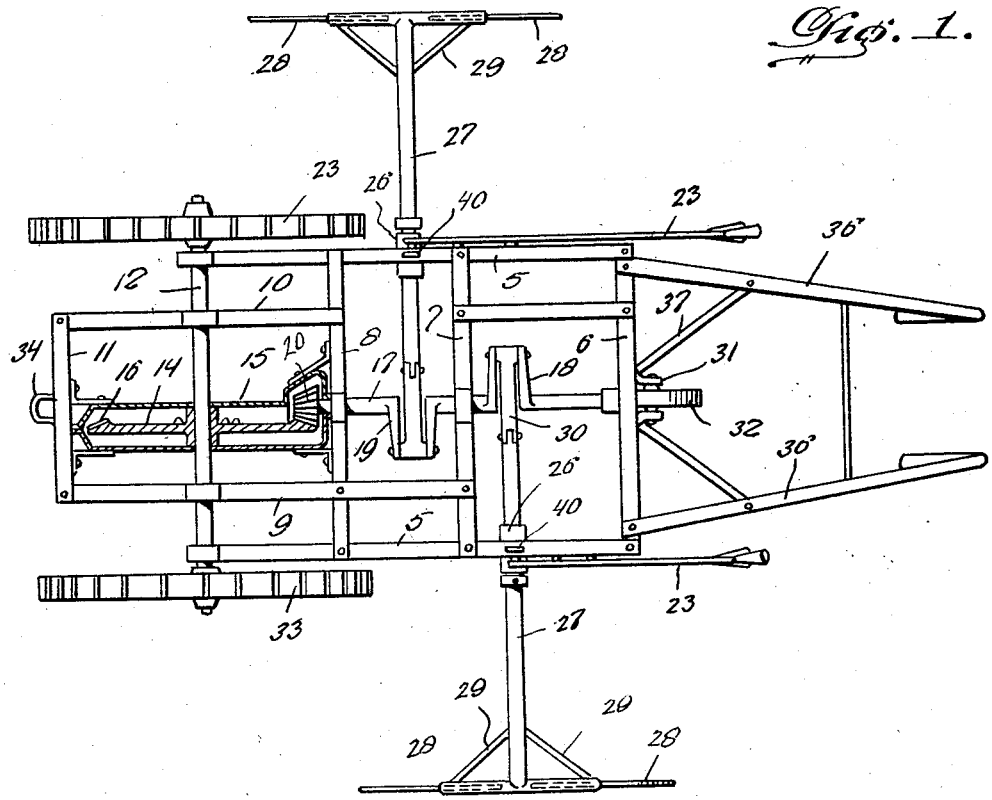
Figure 1 is a top plan view of the machine embodying the features of my invention showing a portion of the drive gear and casing in section.
Figure 4:
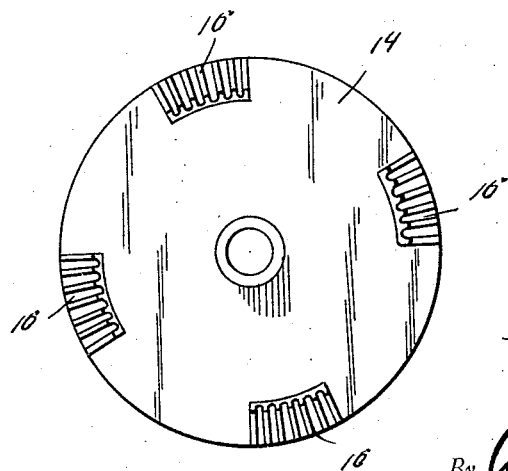
Figure 4 is a plan view of the drive gear.
Figure 2:
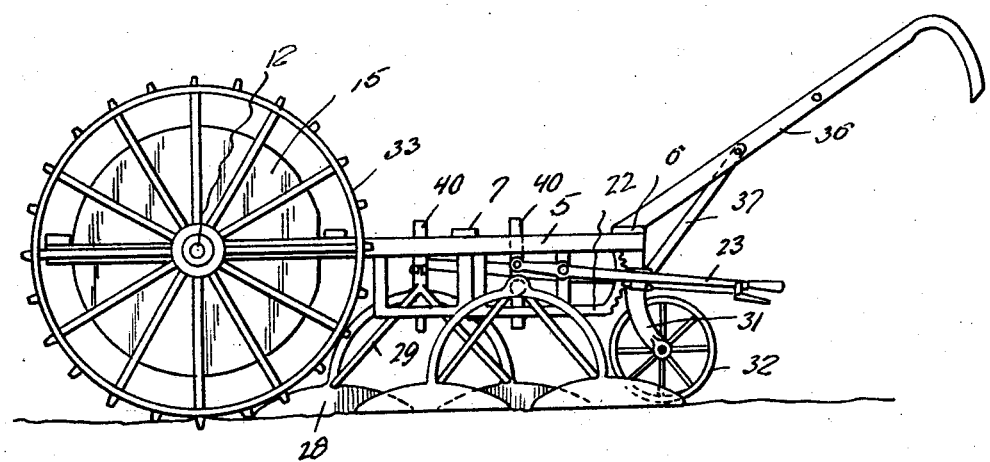
Figure 2 is a side elevation thereof.
Figure 3:
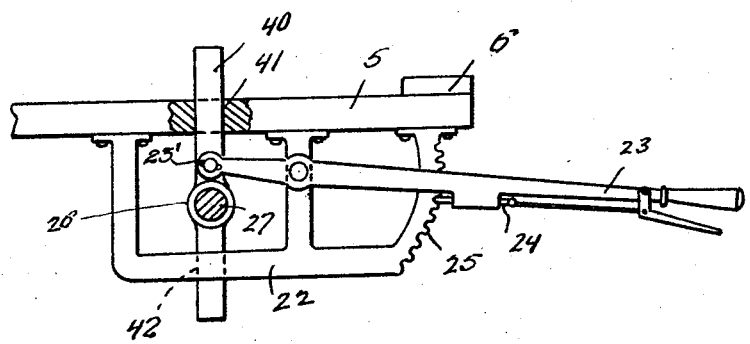
Figure 3 is a detail sectional view showing an adjustable feature.

Referring to the drawing in detail it will be seen that the numerals 5 denote the side members of the frame which are connected by a rear cross member 6 and a pair of spaced parallel intermediate cross members 7 and 8. A member 9 extends longitudinally of the frame being connected to the cross members 7 and 8 and projecting rearwardly therefrom. A longitudinal member 10 is connected to the cross member 8 and extends rearwardly therefrom in parallelism with the member 9. A cross member 11 connects the front ends of the members 9 and 10. These members 9 and 10 are spaced inwardly from the side members 5. An axle 12 is journaled in the front extremities of the side members 5 and intermediate portions of the longitudinal members 9 and 10. A beveled gear 14 is fixed to the shaft 12 to rotate therewith and is housed by a casing 15. This beveled gear 14 has four sets of teeth 16 spaced at equal intervals as is clearly illustrated in Figure 4. A crank shaft 17 is journaled in the cross members 6, 7 and 8, and has crank portions 18 and 19. A beveled gear or pinion 20 is on the forward end of the crank shaft and is adapted to be meshed by the teeth 16 of the beveled gear 14. Thus, upon travel of the machine an intermittent rotation is imparted to the crank shaft 17. The ratio of the teeth 16 to the pinion 20 is such that each group of teeth 16 imparts a one-half rotation to the crank shaft 17. It is also to be noted that the cranks 18 and 19 extend in diametrically opposite directions. Frames 22 extend downwardly from the side members 5, and have rockably mounted thereon the levers 23 having pawls 24 for engagement with arcuate series of teeth 25 formed on the rear edges of the frames 22. Guide rods 40 are formed with bearings 26 and slide vertically through openings 41 and 42 of the side members 5 and frames 22 respectively. Pin and slot connections 23' are provided between the levers 23 and the rods 40. Shanks 27 are slidable through the bearings 26 and have blades 28 at their outer extremities securely braced as at 29. The inner ends of these shanks 27 are pivotally engaged with connecting rods 30 which are engaged with the cranks 18 and 19 respectively. A yoke 31 is mounted on the cross member 6 and has journaled therein a wheel 32. Bull wheels 33 are fixed on the ends of the shaft 12. A clevis 34 is attached to the center of the front cross member 11. Handles 36 extend rearwardly and incline upwardly from the rear cross member 6, and are securely braced with respect thereto by rods 37.

In using this machine a single draft animal is hitched to the clevis 34 and the operator stands to the rear of the machine between the handle 36. As the machine is pulled forwardly by the draft animals, the blades 28, two on each shank 27 move simultaneously outwardly and then simultaneously inwardly in an intermittent manner thereby chopping and thinning out the cotton. The machine operates on two rows at the same time as will be apparent. It will be seen that a single operator of the machine may do the same work as a large number of laborers in a more expeditious manner and in less time.

The present embodiment of the invention has been disclosed in detail merely by way of example since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

1. In a device of the class described, including a frame, wheels on the frame, a crank shaft journaled longitudinally of the frame, means for imparting intermittent rotation through the crank shaft from the wheels, supporting members depending from the frame, levers pivoted on the supporting members, bearings pivoted on the levers, shanks slidable through the bearings laterally of the machine, blades on the outer ends of the shanks, and connecting rods engaging the inner ends of the shanks and the cranks of the crank shafts.

2. In a device of the class described, including a frame, wheels on the frame, a crank shaft journaled longitudinally of the frame, means for imparting intermittent rotation through the crank shaft from the wheels, supporting members depending from the frame, levers pivoted on the supporting members, bearings pivoted on the levers, shanks slidable through the bearings laterally of the machine, blades on the outer ends of the shanks, connecting rods engaging the inner ends of the shank and the cranks of the crank shaft, means for holding the levers in different adjusted positions.

3. A device of the class described including an axle, wheels fixed on the axle, side members having bearings to receive the axle, a casing, a gear in the casing and fixed to the axle and having spaced groups of teeth, a crank shaft, means for journaling the crank shaft between the side members, a pinion on the forward end of the crank shaft within the casing and meshable by the teeth of the gear to impart an intermittent rotation to the crank shaft, a pair of frames, one depending from each side member, levers pivoted intermediate their ends on said frames, bearings pivoted on the forward ends of said levers, shanks slidable through said bearings, means engaging the shanks with the cranks of the crank shaft to impart reciprocation to the shanks upon the rotation of the crank shaft, guide means attached to said bearings and projecting through openings in the side members and the frames, and blades on the outer extremities of the shanks.

In testimony whereof I affix my signature

EDWIN WORTH BEASLEY.